United States Patent
Ben-Natan et al.

(10) Patent No.: US 9,477,997 B2
(45) Date of Patent: Oct. 25, 2016

(54) PROCESSING RESOURCE MANAGEMENT SYSTEM AND METHODS

(71) Applicant: GOOPI SÀRL, Foetz (LU)

(72) Inventors: Avishay Ben-Natan, Rishon Le-Zion (IL); Rami Bahar, Olesh (IL); Eran Tal, Givatayim (IL)

(73) Assignee: GOOPI SÀRL, Foetz (LU)

( * ) Notice: Subject to any disclaimer, the term of this patent is extended or adjusted under 35 U.S.C. 154(b) by 0 days.

(21) Appl. No.: 14/408,976

(22) PCT Filed: Jun. 19, 2013

(86) PCT No.: PCT/IL2013/050524
§ 371 (c)(1),
(2) Date: Dec. 18, 2014

(87) PCT Pub. No.: WO2013/190553
PCT Pub. Date: Dec. 27, 2013

(65) Prior Publication Data
US 2015/0371357 A1    Dec. 24, 2015

Related U.S. Application Data (60) Provisional application No. 61/662,367, filed on Jun. 21, 2012.

(51) Int. Cl.
*G06F 9/50* (2006.01)
*G06T 1/20* (2006.01)

(52) U.S. Cl.
CPC .............. *G06T 1/20* (2013.01); *G06F 9/5027* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 5,546,530 A | * | 8/1996 | Grimaud | G06T 13/00 345/422 |
| 6,560,717 B1 | * | 5/2003 | Scott | G06F 9/505 714/4.1 |

(Continued)

FOREIGN PATENT DOCUMENTS

| | | |
|---|---|---|
| WO | 2008058335 | 5/2008 |
| WO | 2008109233 | 9/2008 |

OTHER PUBLICATIONS

Yao, Jiali, Zhigeng Pan, and Hongxin Zhang. "A distributed render farm system for animation production." Entertainment Computing—ICEC 2009. Springer Berlin Heidelberg, 2009. 264-269.*

(Continued)

*Primary Examiner* — Xiao Wu
*Assistant Examiner* — Yu Chen
(74) *Attorney, Agent, or Firm* — Vorys, Sater, Seymour & Pease LLP (57) ABSTRACT

The present invention discloses a system and methods for parallel processing of multiple processing job requests; the system may include a server for receiving a job request, an algorithm for segmenting the job request to a few sub jobs and a few processors for processing the few sub jobs in parallel. Each sub job contains a few frames to be processed by the job processors and the outputs of few job processors are combined into a single output. The invention further discloses methods for proportional allocation of job segments and an optimization algorithm to automatically assign job requests and to adapt the resources of the system to meet customers demand according to predefined criteria.

12 Claims, 4 Drawing Sheets

(56) References Cited

U.S. PATENT DOCUMENTS

| | | | | |
|---|---|---|---|---|
| 2006/0095912 A1* | 5/2006 | Wood-Gaines | ....... | G06F 9/5027 718/100 |
| 2006/0288346 A1* | 12/2006 | Santos | ................. | G06F 9/4887 718/102 |
| 2008/0256166 A1* | 10/2008 | Branson | .............. | H04L 12/4633 709/201 |
| 2009/0249029 A1* | 10/2009 | Liu | ........................ | G06K 15/02 712/28 |
| 2010/0223128 A1 | 9/2010 | Dukellis | | |
| 2011/0173247 A1* | 7/2011 | Hubbard | ................ | G06Q 30/02 709/203 |
| 2014/0237373 A1* | 8/2014 | Kennedy | ............... | G06F 9/5072 715/736 |

OTHER PUBLICATIONS

Chong, Anthony, Alexei Sourin, and Konstantin Levinski. "Grid-based computer animation rendering." Proceedings of the 4th international conference on Computer graphics and interactive techniques in Australasia and Southeast Asia. ACM, 2006.*

Glez-Morcillo, C., et al. "A New Approach to Grid Computing for Distributed Rendering." P2P, Parallel, Grid, Cloud and Internet Computing (3PGCIC), 2011 International Conference on. IEEE, 2011.*

* cited by examiner

PROCESSING RESOURCE MANAGEMENT SYSTEM AND METHODS

RELATED APPLICATION DATA

The present application is a U.S. National Stage application of International Application No. PCT/IL2013/050524, filed Jun. 19, 2013, which claims the benefit of U.S. Provisional Application No. 61/662,367, filed Jun. 21, 2012, each of which are herein incorporated by reference thereto in their entirety for all purposes.

FIELD AND BACKGROUND OF THE INVENTION

The present invention is related to the field of computers; more specifically but not exclusively, the invention is related to the field of processing few frames in parallel for speeding overall processing duration.

Today, the media which is being produced by computers is increasing exponentially. The media which is being produced includes for example, videos, animations and other such combinations which are designed to "catch the eye" of the viewers, to arise intrigue, and as a result, to convey a message to the viewer or simply to draw his attention for gaining commercial value.

For this reason, displaying a static message such as an advertisement to a potential viewer will probably not suffice to draw the attention of the viewer as the static ad will not stand out compared to the other animated ads which are present near the static ad.

As the digital media gradually cuts out the traditional physical media, the demand for videos and animations exceeds with it. For instance, newspapers and books are being published digitally; in fact, specific hardware in the form of digital readers is being developed to ease the readers to consume more and more digital media and to enhance their experience when doing so. The digital newspapers and books are not mere replications of their physical versions; they often include animations and videos to better convey the messages for which they were edited. Such enhanced user experience is cross-bounding; users demand such experience even in their own digital media. For example, users want their; web-sites, digital albums, etc. to include such animations and videos. Business owners utilize this technology to generate banners, digital menus, and video clips to attract potential customers.

However, although producing such digital media is on demand, the production of such media has yet been adopted by the masses. The adoption of such digital media entails a few setbacks.

First, the processing power which is required to produce such digital media is considerable. The processing of a few frames is usually referred to by the art as "rendering". The rendering which is required to produce a video or an animation is dependent on the length of the video (the number of frames) and on the resolution of the video (the weight of each frame). Because videos usually include twenty five frames per second and because a standard frame may consist of 640×480 pixels, producing a few seconds of animation may take about an hour of rendering time depending of the processors performing the rendering job. Not to mention, when the media rendered is long (a few hours) and the resolution is high (1024×768 or more) the rendering time may take a few hours even when utilizing state-of the art processors.

Second, producing animations requires skill. In order to produce animations one needs to use a software tool such as "Adobe After Effects". The use of such software tools is not trivial to a layman. In addition, these software tools often charge a monthly fee or a licensing fee, making them out of reach for mass adoption.

In order to overcome the first setback described above, Adobe suggested the notion of utilizing a "Rendering Farm";
http://help.adobe.com/en US/AfterEffects/9.0/ WS3878526689cb91655866c1103a_4f2dff7-79a2a.html A Rendering Farm uses multiple computers over the network to save rendering time. Some Rendering Farms work on a frame by frame basis. Meaning, a certain computer starts rendering a certain frame, if another computer is being indicated that the frame is already being rendered by the certain computer, and then the other computer simply starts rendering the next frame instead.

As for the second setback described above, some suggestions have been offered by the art in order to overcome it, here are a few examples:

US Patent Application US2010223128 to Dukellis, depicts templates that contain visual effects, synchronization information, and possibly director assistance. These templates are utilized by a second set of persons to generate personalized motion photo videos from photographs, video segments, personal narratives or animation.

World publication WO2008109233 to Estrop, depicts audiovisual works which can be automatically created based upon inferred and implicit metadata including music genre, image captions, song structure, image focal points, as well as user-supplied data such as text tags, emphasis flags, groupings, and preferred video style.

SUMMARY OF THE INVENTION

The present invention discloses a method for parallel processing; the method may comprise the following steps:
 a. Receiving multiple job requests;
 b. Segmenting job requests into sub jobs;
 c. Processing sub jobs by few processors in parallel;
 wherein each sub job may contain a few frames to be processed by the job processors and wherein the outputs of few job processors may be aggregated into a single output.

The method may further include assigning a priority value to each of the job requests. The priority value may be comprised by taking into consideration the priority of the job request as requested by the client and by the obligations to meet the priority requested by the client.

The method may further comprise an optimization algorithm; the optimization algorithm may take into consideration; the priority of the job requests, the proximity of the node to the job request, the availability of the job processors, the processing power of each job processor and operate the system in accordance. The optimization algorithm may further take into consideration the estimated rendering required to specific frames in order to segment a job into sub jobs proportionally. The optimization algorithm may also take into consideration cost-effective parameters such as; the cost of the node or a number of nodes on a particular cloud, the urgency of the job request compared to the availability and cost of the nodes, the availability of the licensed plugins for the relevant job request etc.

The method may include segmenting a job into a number of sub jobs which is larger than the number of the job processors.

The method may include forming sub jobs which are comprised of frames which are randomly selected from the job request.

The optimization algorithm may modify the structure of the system to improve performance and to adapt processing resources to clients' demand.

The structure of the system may include job processors at different geographic locations all over the world. The job processors may be computers of private users or commercial processing clouds which may be utilized for an agreed upon compensation.

The method may further include encoding the output data by the few processors.

The method may further comprise a rendezvous server; the structure of the system may be controlled by the rendezvous server manually or automatically by the optimization algorithm.

The method may further comprise sharing or sending the single output to a destination provided by the client such as a social network.

The method may further comprise an intuitive user interface; the user interface may be applied via a web-site.

The present invention discloses a system for parallel processing, the system may comprise:
  a. A server for receiving a job request;
  b. An algorithm for segmenting each request to few sub jobs;
  c. A few processors for processing few sub jobs in parallel;

wherein each sub job contains a few frames to be processed by the job processors and wherein the outputs of the few job processors are combined into a single output.

DETAILED DESCRIPTION OF THE INVENTION

For a better understanding of the invention and to show how the same may be carried into effect, reference will now be made, purely by way of example, to the accompanying drawings. With specific reference to the drawings in detail, it is stressed that the particulars shown are by way of example and for purposes of illustrative discussion of preferred embodiments of the present invention only, and are presented for the purpose of providing what is believed to be the most useful and readily understood description of the principles and conceptual aspects of the invention. In this regard, no attempt is made to show structural details of the invention in more detail than is necessary for a fundamental understanding of the invention. From the description taken together with the drawings it will be apparent to those skilled in the art how the several forms of the invention may be embodied in practice. Moreover, it is to be understood that the phraseology and terminology employed herein is for the purpose of description and should not be regarded as limiting the scope of the invention hereof.

Figure 1:
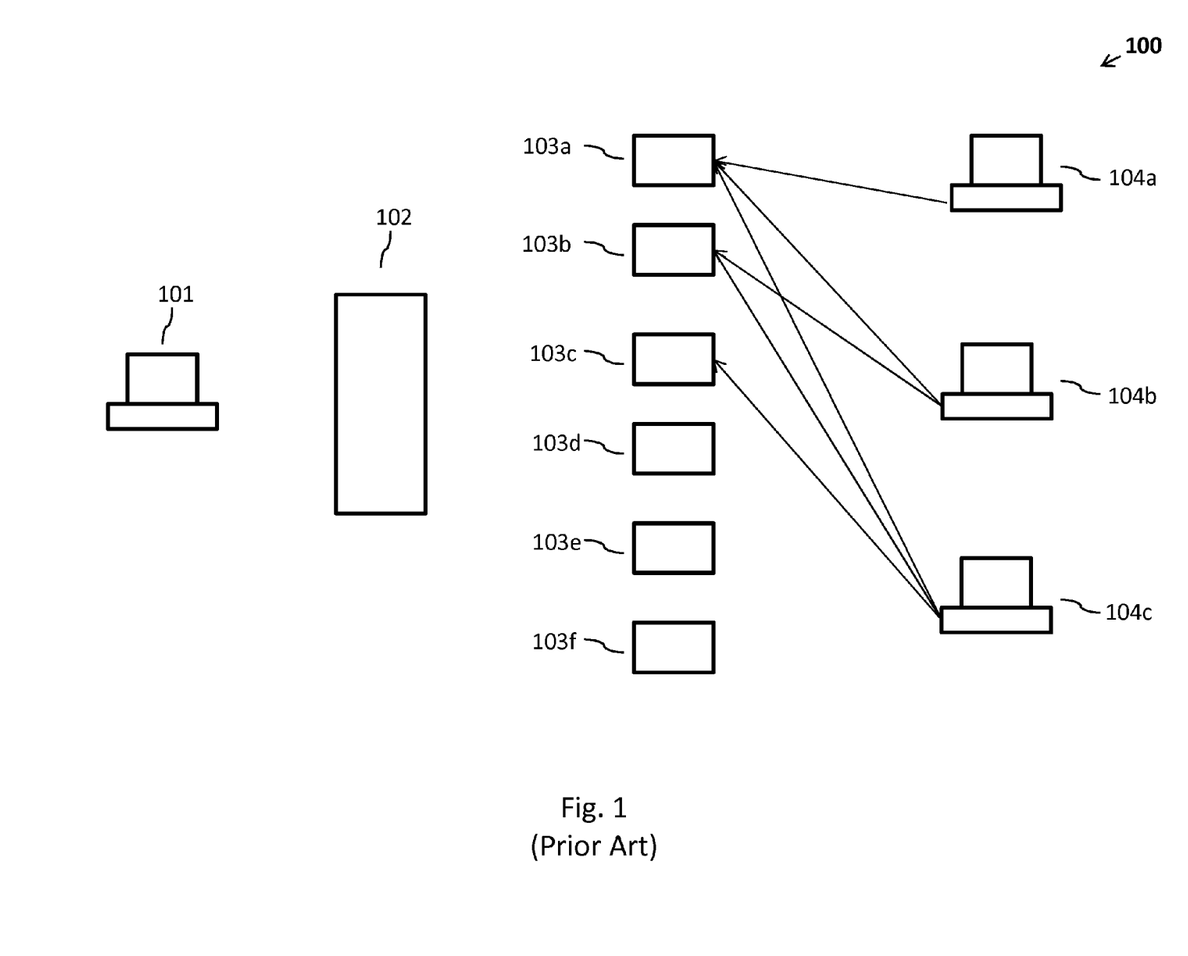
FIG. 1 schematically shows a rendering farm scheme as depicted by the prior art.

FIG. 1 schematically shows a rendering farm scheme as depicted by the prior art 100. A client 101 sends a job to be managed by a server 102, the job consists of processing six frames 103a-103f. Three processors 104a-104c are assigned in parallel to do the job. The first processor 104a, starts rendering the first frame 103a, the second processor 104b accesses the first frame 103a, when the second processor 104b is being indicated by the server 102 that the first frame 103a is already being rendered by the first processor 104a, the second processor 104b accesses the next frame in line 103b, if no other processor had already begun rendering the second frame 103b then the second processor 104b will begin to do so. The third processor 104c, accesses the first frame 103a, when indicated that the first frame 103a is already being processed, the third processor 104c accesses the second frame 103b, when indicated that the second frame 103b is already being processed, the third processor 104c accesses the third frame 103c which is free to work on. Whenever a processor 104a-104c finishes working on a certain frame, it continues to search for the next frame in line which is free to work on mutatis mutandis.

Figure 2:
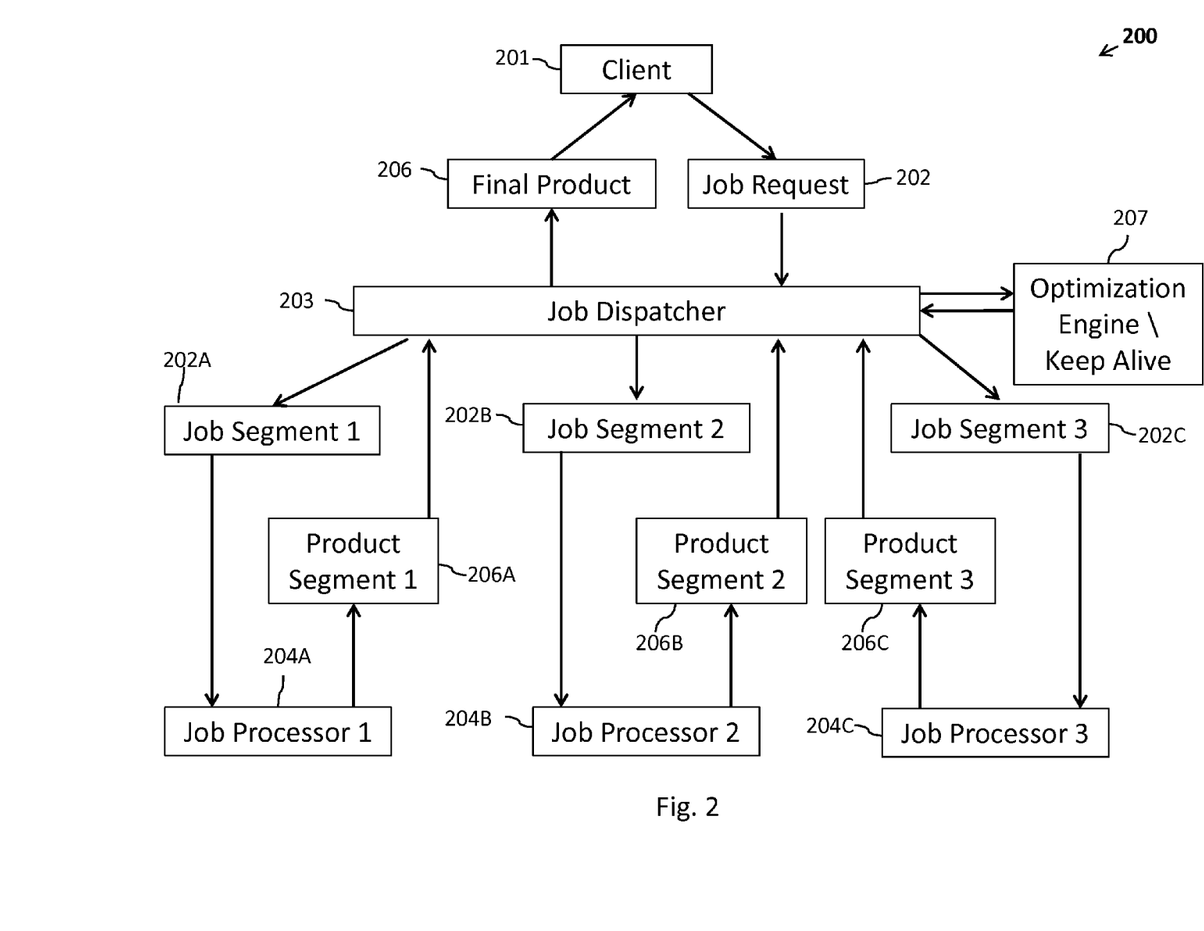
FIG. 2 schematically shows a scheme of the main components of a system for parallel processing of multiple frame packs.

FIG. 2 schematically shows a scheme of the main components of a system for parallel processing of multiple frame packs 200. A client 201 sends a job request 202 to the system 200, the job request 202 includes processing of multiple frames (rendering) in order to produce a video animation; the job request 202 is received by the job dispatcher 203. The job dispatcher 203 runs an optimization engine 207 to analyze the amount of resources required to perform the job request 202 and to prioritize the job request 202 compared to other pending job requests received by the system 200. The optimization engines 207 outputs are used to segment the job request 202 to job segments 202A-202C, each job segment 202A-202C includes a pack of frames to be rendered by a corresponding job processor 204A-204C.

In order to maximize the usage of the job processors, the job dispatcher may segment the job into a number of segments which is larger than the number of the job processors, such that if a certain job processor finishes processing a sub job and becomes available, a pending job segment may be dispatched to be processed by that job processor. The advantage of such a segmentation strategy is that it is simple to execute, it does not require pre-processing to evaluate the processing power required to each job segment and it takes into account the actual performance of the job processors in real-time. The ideal proportion between the number of job segments with respect to a job and to the number of job processors being used may be a function of the efficiency learned from past experience taking into consideration real-time parameters such as the actual delivery of specific product segments by specific job processors.

The segmentation of the job request 202 may further dependent on few criteria among which are; the number of available job processors taking into consideration the processing power of each job processor. For instance, if a certain job request includes processing six hundred frames, and there are three job processors available having an equal processing power, then the job request will be segmented to three equal sub jobs and each job processor will be assigned a sub job of processing two hundred frames. However, if a certain job processor is faster than the other job processors then the job dispatcher may assign a larger job segment to the faster job processor such that the three job processors will finish their sub jobs at the same time. For example, if one of the job processors has a processing power which is twice as fast as the other two job processors, than the job dispatcher will assign a sub job segment twice as large (processing three hundred frames) to that job processor and each of the other job processors will be assigned a sub job of processing one hundred and fifty frames such that all three job processors will finish their sub jobs approximately at the same time. Because each frame may require a different amount of rendering, additional measures may be taken to achieve proportional segmentation of the sub jobs. For instance, the system may evaluate in advance, the processing power required to each frame or to random frames and segment the job into sub jobs while taking this factor into consideration. Such evaluation may be done while running a preview for example. Alternatively, each sub job may be comprised of random frames selected from the job to reduce probability of undesired processing power deviations between sub jobs. After the job segments have been processed into product segments, the job dispatcher rearranges the processed frames according to their original order to create the final product. Another criteria which is taken into consideration for the job segmentation process is the priority of each job request as further detailed in FIG. 4. Such segmentation calculations as detailed herewith can be performed on large scales mutatis mutandis, taking into consideration many job requests to be processed in parallel by many job processors taking into consideration the aforementioned as well as additional criteria. The job segments 202A-202C are performed in parallel by the job processor 204A-204C. The output of each job processor 204A-204C is a corresponding product segment 206A-206C. The job dispatcher 203 aggregates the product segment 206A-206C into the final product 206 which is the complete rendered video animation which is provided to the client 201. The system may also run a similar process to provide a preview of the requested job mutatis mutandis.

Figure 3:
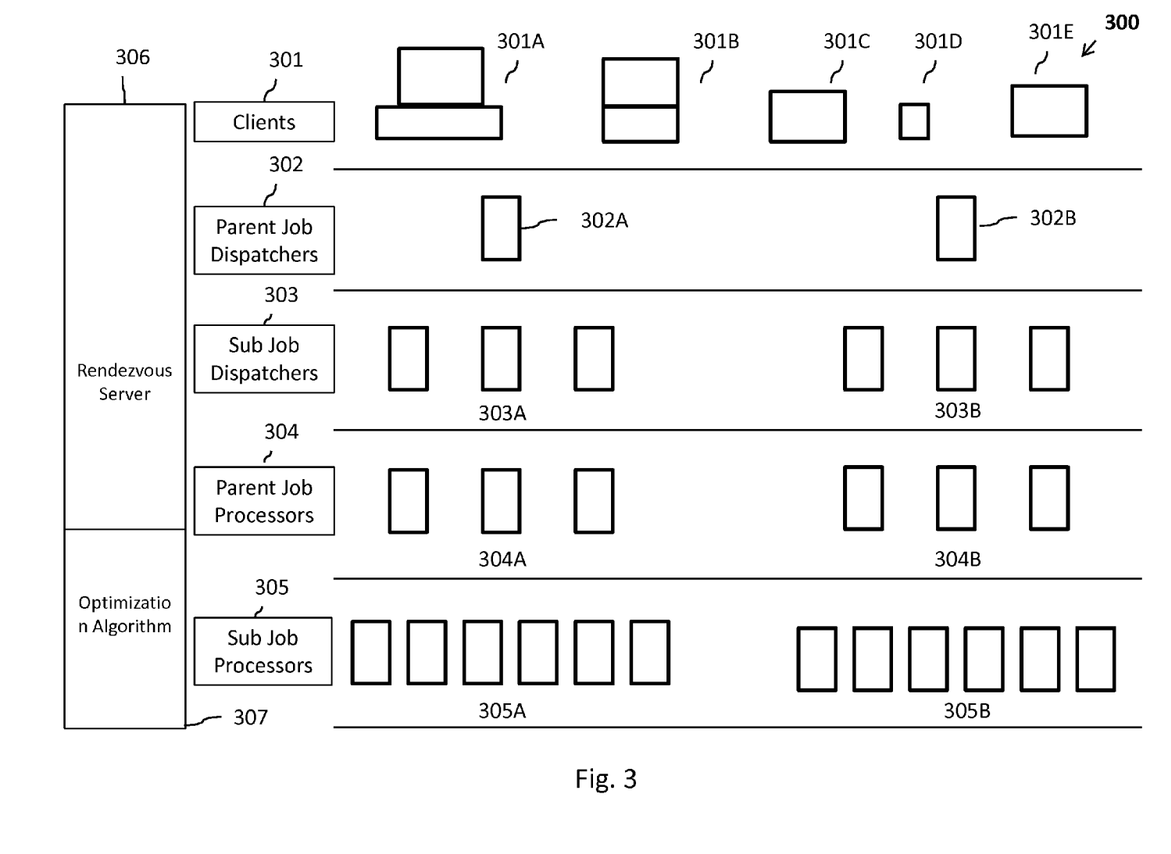
FIG. 3 schematically shows a scheme of the main components of a hierarchical system for parallel processing of multiple frame packs.

FIG. 3 schematically shows a scheme of the main components of a hierarchical system for parallel processing of multiple frame packs 300. A hierarchical system for parallel processing of multiple frame packs 300 is used to provide scalability and flexibility in the amount of parallel processing which can be performed by the system with respect to time. Such flexibility can be used to perform large job requests fast and to perform few job requests for a few clients in parallel. In other words, the system 300 manages and modifies its processing resources based on interchangeable criteria as further described below.

The system 300 provides services to multiple clients 301A-301E simultaneously. The clients are digital animators, digital graphic designers, digital editors, video artists, layman wishing to create effects for leisure such as photo albums or for commercial use such as websites, restaurants digital menus, banners etc. The client's 301 may access the service using Personal Computers, Laptops, Tablets, Smartphones, and Smart TVs 301A-301E respectively.

The services of the system 300 are provided via a web-site which includes an intuitive interface and templates (not shown) by which both professionals and layman can use the services of the system 300. Using the web-site does not require dedicated installations (plug-ins).

The job requests sent by the clients 301 are received by the parent job dispatchers 302. Each parent job dispatcher 302A and 302B, dispatches the job requests to its corresponding sub job dispatcher 303A and 303B respectively. The sub job dispatchers 303A and 303B segment the job requests into sub jobs to be performed by the parent job processors 304. The parent job processors 304A and 304B segment the sub jobs again to tasks to be performed by the sub job processors 305. Each sub job processor 305A and 305B having performed its tasks, sends its outputs to the corresponding parent job processor which assigned it the task (304A and 304B respectively). The parent job processors 304 aggregates the tasks outputs into product segments and send the product segments to the corresponding sub job dispatcher 303A and 303B respectively, the sub job dispatchers 303 aggregates the product segments into the final products and send the final products to their corresponding parent job dispatchers 302A and 302B from which the final product is being sent to the clients 301. The final product is a file which can be downloaded or shared by the clients 301.

A rendezvous server 306 is used to add and remove components to the system 300. For instance, the rendezvous server 306 is used to add sub job processors 305 when additional processing power is required. The structure of the system 300 can be modified manually by an operator via the rendezvous server 306. Alternatively, the structure of the system 300 can be modified automatically according to predefined criteria. For example, when the processing power required exceeds a certain criteria, the rendezvous server 306 can automatically add sub job processors to the system 300, until the processing load is decreased to a desired level. An optimization algorithm 307 calculates the processing power required taking into consideration time constraints. For example, if a certain customer demands a job request to be performed immediately, and the system currently lacks a certain resource to enable such instant performance, then the optimization algorithm 307 may add that missing resource to the system automatically via the rendezvous server 306. When the job is finished, the resource may be removed from the system until further use is required. In other words, the system includes a flexible structure which can be modified in real-time taking into consideration the overall work load and the priority given to each job. This flexibility is also used for redundancy purposes. For example, is a certain sub job processor malfunctions or if the communication with it is down, the system simply adds another functional sub job processor in lieu of the malfunctioning job processor. The sub job processors 305 may be computers all over the world. Meaning, the system 300 may utilize its own integral sub job processors 305, in addition, the system may utilize other sub job processors according to permissions or to leasing agreements with the owners of the sub job processors. For example, a private person may permit the system 300 to utilize his Personal Computer as a sub job processor during certain hours in exchange for agreed upon compensation. The compensation can be based on a monthly fee or on the actual use of computation power per month etc. According to such permissions, the system 300 can therefore be adapted, to execute large amounts of job requests simultaneously by utilizing a large number of job processors at its disposal. The job processors may be geographically located all over the world.

Figure 4:
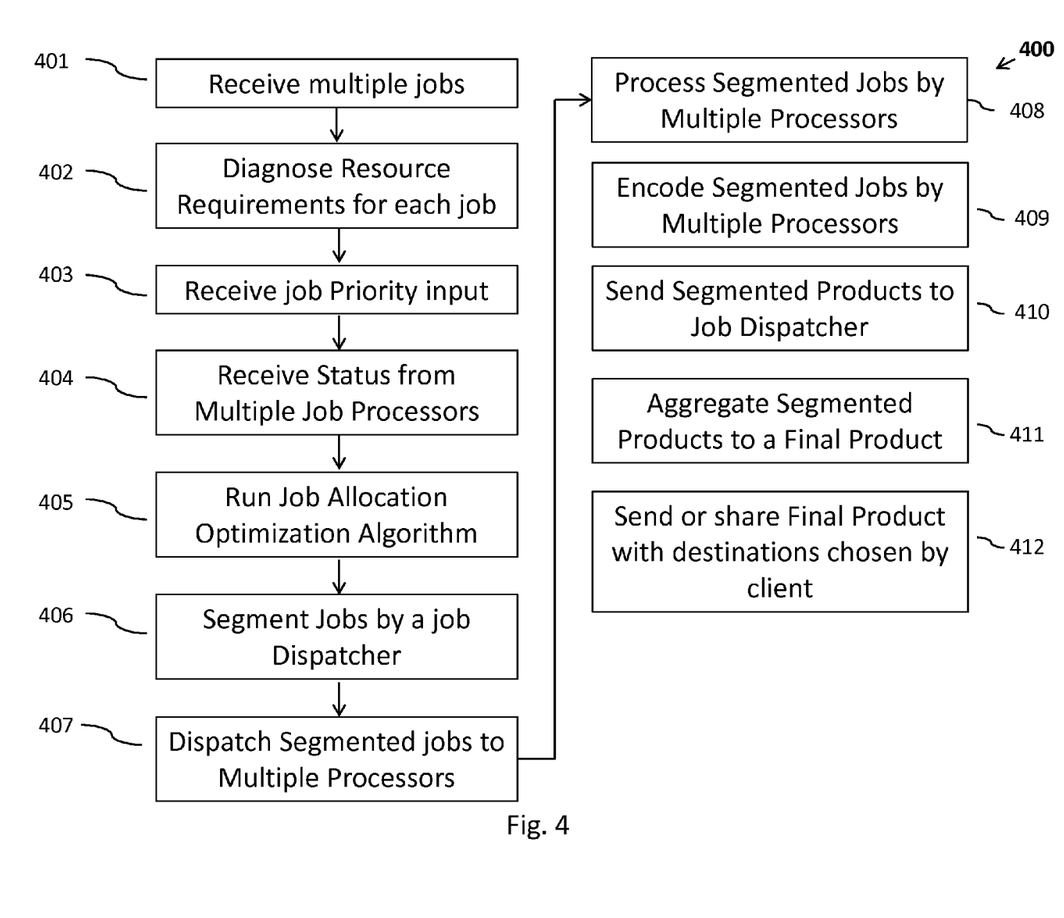
FIG. 4 schematically shows a method for parallel processing of multiple frame packs.

FIG. 4 schematically shows a method for parallel processing of multiple frame packs 400. Step 401 is receiving multiple jobs to be performed by the system. Step 402 is diagnosing the resources required to perform each job, including checking the number of frames to be processed and the resolution of each frame. Each job is assigned a priority value 403, the priority value differentiates the urgency between pending jobs. The priority value is determined by the clients request for the job, for instance; immediate, within the next hour, within the next three hours etc. In addition, the obligation of the system to meet the clients request is determined by the client's agreement with the company providing the services. For example, the client may pay a fee which credits the client with a certain amount of real-time processing or a smaller fee which credits the client with up to an hour of a certain amount of processing, alternatively, the client may use the services free of charge subject to the availability of the system to run the clients job request without compromising the services to other clients at a given time. The system receives the availability status from multiple job processors 404, each job processor sends its availability status, and if the job processor is unavailable (due to its occupation by another job) then the job processor sends its prediction as to when it will be available (when the current job is expected to be finished). An optimization algorithm 405 lists the pending jobs according to their priority and calculates the cost-effectiveness of each job request for example, the optimization algorithm may calculated the amount paid by the client for the execution of the job request compared to the cost of the job request which may be comprised by rendering job processors, paying for plug-ins etc. The job dispatcher 406 segments the job into multiple sub jobs, each sub job is dispatched 407 to a job processor, and each sub job includes a few frames to be processed (rendered) by a corresponding job processor 408. The job processors render the frame packs assigned to them and encode the data, the encoded data from each job processor (the "segmented product") is sent to the job dispatcher 410, the job dispatcher aggregates segmented products into final product 411 and sends the final product to the client. The final product can be sent as a link or as a file, the final product can also be sent directly to Facebook, YouTube or any other desired location according to the users' preferences 412.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for parallel rendering of multiple video processing jobs, the method comprising:
   receiving multiple video processing jobs, each video processing job comprising multiple video frames;
   segmenting each video processing job into sub jobs, each sub job comprising a pack of video frames selected from the multiple video frames;
   rendering the sub jobs by multiple sub job processors, thereby generating multiple segmented video products in parallel;
   encoding the multiple segmented video products by the multiple sub job processors; and
   aggregating the multiple segmented video products into a final video product, wherein said segmenting utilizes an optimization algorithm configured for:
   pre-processing the multiple video processing jobs for evaluating processing loads of a few frames in the multiple video frames; and
   packing frames from the multiple video frames into the packs of video frames based on the evaluated processing loads of the few frames, such that a processing load of at least a few sub jobs is proportional to a processing power of the sub job processors by which said a few subs job are rendered.

2. The method according to claim 1, wherein a priority value is assigned to each of the multiple video processing jobs.

3. The method according to claim 1, wherein a priority value is composed by taking into consideration a client priority value requested by a client and system obligations to meet the client priority value.

4. The method according to claim 1, wherein the optimization algorithm is a learning algorithm, configured to learn from past experience, to consider real-time parameters and consider a processing power of each of the sub job processors.

5. The method according to claim 1, wherein parent job processors, functionally associated with at least one parent job dispatcher and each comprising multiple sub job processors, are configured to receive video processing jobs from the parent job dispatcher and to segment the video processing jobs into sub jobs to be processed by the multiple sub job processors, wherein the parent job processors are located at different geographic locations.

6. The method according to claim 5, wherein at least a few sub-job processors are private-user processors.

7. The method according to claim 1, wherein the optimization algorithm takes into consideration cost effective parameters.

8. The method according to claim 1, wherein a rendezvous server is configured to add or remove one or more sub job processors to or from the multiple sub job processors dynamically.

9. The method according to claim 1, further comprising interfacing with a user using an intuitive user interface provided via a web-site.

10. A system for parallel rendering of multiple video processing jobs, the system comprising:
    a server configured for
    receiving multiple video processing jobs comprising multiple video frames;
    utilizing an optimization algorithm, segmenting each processing job into multiple sub jobs such that each sub job comprises a pack of frames selected from the multiple video frames, to be rendered into multiple segmented video products using multiple sub job processors, and
    aggregating the multiple segmented video products into a final video product; and
    multiple sub job processors configured for rendering the multiple segmented sub jobs and for encoding each sub job to a segmented video product by the multiple sub job processors in parallel, wherein said optimization algorithm comprises:
    pre-processing the multiple video processing jobs for evaluating processing loads of a few frames in the multiple video frames; and packing frames from the multiple video frames into the packs of video frames based on the evaluated processing loads of the few frames, such that a processing load of at least a few sub jobs is proportional to a processing power of the sub job processors by which said at least a few sub jobs are rendered.

11. The system according to claim 10, wherein a rendezvous server is configured to add or remove one or more sub job processors to the multiple sub job processors dynamically.

12. The system according to claim 10, wherein the multiple sub job processors are located at different geographic locations and are associated with a job dispatcher.

\* \* \* \* \*